United States Patent
Hart et al.

(10) Patent No.: US 10,502,528 B2
(45) Date of Patent: Dec. 10, 2019

(54) TARGET DESIGNATOR

(71) Applicant: MBDA UK Limited, Stevenage, Hertfordshire (GB)

(72) Inventors: Gordon James Hart, Filton Bristol (GB); Nathan Rees Potter, Filton Bristol (GB); Christopher James Vance, Filton Bristol (GB); Kerry Benjamin Tatlock, Filton Bristol (GB); James Andrew Hicks, Filton Bristol (GB); James Alexander Donald Hinshelwood, Filton Bristol (GB)

(73) Assignee: MBDA UK Limited, Stevenage, Hertfordshire (GB)

( * ) Notice: Subject to any disclaimer, the term of this patent is extended or adjusted under 35 U.S.C. 154(b) by 0 days.

(21) Appl. No.: 15/763,592

(22) PCT Filed: Sep. 30, 2016

(86) PCT No.: PCT/GB2016/053053
§ 371 (c)(1),
(2) Date: Mar. 27, 2018

(87) PCT Pub. No.: WO2017/055868
PCT Pub. Date: Apr. 6, 2017

(65) Prior Publication Data
US 2018/0321016 A1    Nov. 8, 2018

(30) Foreign Application Priority Data
Sep. 30, 2015    (GB) .................................. 1517270.3

(51) Int. Cl.
*G06F 19/00*    (2018.01)
*F41G 3/02*    (2006.01)
(Continued)

(52) U.S. Cl.
CPC ............... *F41G 3/02* (2013.01); *F41G 3/165* (2013.01); *F41G 3/225* (2013.01); *F41G 7/007* (2013.01);
(Continued)

(58) Field of Classification Search
CPC . F41G 3/02; F41G 3/165; F41G 3/225; F41G 7/007; F41G 7/2253; G02B 27/0093; G06F 3/013
(Continued)

(56) References Cited

U.S. PATENT DOCUMENTS 4,028,725 A * 6/1977 Lewis .................... G01S 5/163
                                                                  235/411
7,401,920 B1    7/2008 Kranz et al.
(Continued)

FOREIGN PATENT DOCUMENTS

| EP | 1195574 A1 | 4/2002 |
|---|---|---|
| JP | 2013-117361 A | 6/2013 |
| KR | 20150105765 A | 9/2015 |

OTHER PUBLICATIONS

International Preliminary Report on Patentability dated Apr. 3, 2018 issued in PCT/GB2016/053053.
(Continued)

*Primary Examiner* — Karl D Frech
(74) *Attorney, Agent, or Firm* — Scully, Scott, Murphy & Presser P.C.

(57) ABSTRACT

A target designator for a guided weapon is disclosed. The designator has a sight arranged to display, in operation, a reticule superimposed upon a field of view. The reticule is moveable within the field of view. The designator further comprises an eye tracker operable to track the gaze of the operator whilst the operator uses the sight. The eye tracker communicates with the sight such that the reticule moves so as to be aligned with the direction of the gaze of the operator.

15 Claims, 3 Drawing Sheets

(51) Int. Cl.
    *F41G 3/16*     (2006.01)
    *F41G 3/22*     (2006.01)
    *F41G 7/00*     (2006.01)
    *F41G 7/22*     (2006.01)
    *G02B 27/00*     (2006.01)
    *G06F 3/01*     (2006.01)

(52) U.S. Cl.
    CPC ....... *F41G 7/2253* (2013.01); *G02B 27/0093* (2013.01); *G06F 3/013* (2013.01)

(58) Field of Classification Search
    USPC .......................................... 235/404, 400, 411
    See application file for complete search history.

(56) References Cited

U.S. PATENT DOCUMENTS

2008/0136916 A1    6/2008    Wolff
2010/0185113 A1    7/2010    Peot et al.

OTHER PUBLICATIONS

International Search Report and Written Opinion dated Nov. 22, 2016 issued in PCT/GB2016/053053.
GB Search Report dated Dec. 18, 2015 issued in GB1517270.3.

\* cited by examiner

TARGET DESIGNATOR

FIELD OF THE INVENTION

This invention relates to a handheld target designator for a guided weapon. More particularly, but not exclusively, the invention relates to target designators in which eye-tracking is used to designate a target to the guided weapon.

BACKGROUND

Guided weapons make use of sensors and guidance algorithms to guide them, once launched, towards a designated target. Occasionally, it may be possible for target designation to occur automatically (for example, the designation of an aircraft silhouetted against a clear sky), but in many cases it will be necessary for an operator to designate the target to the weapon. Currently this is done by means of a targeting reticule. In some cases the reticule may be fixed to the launcher, such that the crosshairs are permanently fixed to the boresight of the weapon. Target designation is then achieved by moving the launcher until the crosshairs are over the target. In other cases a moving reticule is provided, so that the operator can move the reticule by means of a hand control, such as a joystick, using the whole hand, or sticks or D-pads, for which only the operator's thumbs are required.

However, both fixed and moveable reticule systems suffer from problems in target designation. In the case of handheld systems, using fixed reticules, particularly where the weapon and launch system is heavy, selection of a small target in a relatively large and cluttered field of view can be difficult, because the whole system must be moved in order to set the target. This makes fine movements, which may be difficult where the target is relatively small within the field of view, difficult. In contrast, the provision of a moving reticule can assist in such fine movements. However, for the operator to perform fine control movements of the reticule using thumbs, whilst using both hands to hold and steady a guided weapon system (weighing potentially tens of kilograms) can be difficult, and may be impossible where the operator is on a moving and unsteady platform. Similar problems exist for other weapon systems used when the operator is required to hold other equipment steady whilst designating a target; or where the operator is moving across ground on foot whilst attempting to designate a target.

SUMMARY OF THE INVENTION

In accordance with a first aspect of the invention, there is provided a target designator for a guided weapon, the designator having a sight arranged to display, in operation, a reticule superimposed upon a field of view, the reticule being moveable relative to the field of view; the designator further comprising an eye tracker operable to track the gaze of the operator whilst the operator uses the sight; and the eye tracker being in communication with the sight such that the reticule moves so as to be aligned with the direction of the gaze of the operator.

The provision of a reticule that can be moved by the operator simply by moving direction of gaze enables the target designator to be operated in a number of scenarios where previously operation would not be possible. For example, the designator can be operated whilst the operator is on a moving or unsteady platform, and the operator is moreover able to designate moving targets, since the operator's gaze will remain focussed on the desired target, whereas very delicate hand control (very difficult when the operator is on a moving or unsteady platform, supporting the launcher, and impracticable in a combat situation) would be required to designate a moving target for prior known systems. Even on stable ground the operator's own small scale movements, resulting simply from breathing, or hand tremble, may impose a significant error on long range targeting, which would be obviated through the use of eye tracking for target designation. In addition, the target designator can be used whilst the operator is running or walking across ground, where again fine hand control may not be possible. In such a situation it will be appreciated that the designator may be remote from the weapon itself. Thus the target designator is operable against a greater number of targets and provides the operator with a greater degree of flexibility in combat situations.

The eye tracker may be a wearable device. Wearable eye trackers are commercially available and thus have the advantage of simplicity. It is envisaged that it may be preferable for the eye tracker to be integrated with the sight so as to reduce the overall load that the operator is required to carry. Thus, for example, the eye tracker and sight may be integrated into a helmet-mounted system, communicating with a remote weapon system.

The eye tracker may be mounted on the sight. The sight may be a telescopic device through which the field of view is visible. For example, the target designator may be incorporated onto a handheld launcher for a guided weapon, and the eye tracker retrofitted to an existing sight. In such embodiments, the operator's field of view may differ from the view of the weapon's sensors, such that the weapon may perform additional processing in order for the target on which the operator's gaze is focussed to be designated as a target to the weapon. Such processing can be readily implemented in software, and as a result such embodiments can be readily retrofitted as improvements to existing systems.

The guided weapon may be provided with a camera, and the field of view displayed by the sight may be provided by the camera. In such embodiments, the operator's view is the same as that of the weapon, so that the operator can designate a target directly to the weapon, using the same image source as the weapon's guidance algorithms.

The eye tracker may be associated with a processor configured to recognise one or more eye gestures, and to control the sight such that the field of view displayed by the sight is altered in response to the one or more eye gestures. The use of eye gestures to control the sight removes the need for the use of certain other user interaction mechanisms for that purpose, enabling the field of view to be altered without the use of hand control. As with targeting, use of hand control may be difficult in circumstances where the operator is stood on a moving or unsteady platform, or where the operator is otherwise encumbered. For example, one of the one or more eye gestures may cause the sight to zoom in on a portion of the field of view. It will be appreciated that the mechanism by which the zoom is accomplished may be internal to the sight (where the sight is a telescopic device) or may be achieved by a camera (where the sight provides a field of view from a camera which, for example, may be a part of a weapon sensor cluster). The ability to zoom in on a particular region of the field of view, without the need for operation of any controls by hand, has been found to be particularly useful where targets that are relatively small within the field of view (having dimensions of, say, only a few pixels across) are to be designators. Zooming in enables more accurate designation of such targets. One of the one or more eye gestures may cause the sight to move the field of view. One of the one or more eye gestures may cause the sight to zoom out.

The display may be configured to zoom either in or out depending on the position of the operator's gaze within the field of view. The display may have first and second regions, and the display may zoom in when the operator's gaze lingers in a first region, and zoom out when the operator's gaze lingers in a second region. The rate of zoom may be dependent on a distance between the operator's gaze and the boundary between the first and second regions.

The designator may further comprise a trigger device, and the designator may be configured such that, upon a first operation on the trigger device, the weapon selects as a target an object on which the reticule is centred.

The designator may be configured to detect when the operator's gaze settles on a particular object for longer than a predetermined period of time, and to designate that object to the guided weapon as a target.

The designator may comprise communication means for communicating with a remote weapon such that a target can be designated to the remote weapon. Similar advantages to those described above are achieved for designation of targets to remote weapons, when designation is to be performed by an operator either encumbered by other equipment or loads, or a moving operator.

The target designator may be a handheld target designator

The invention extends to a handheld launcher for a guided weapon comprising a designator as described above.

BRIEF DESCRIPTION OF THE DRAWINGS

There follows, by way of example only, a detailed description of a specific embodiment of the invention with reference to the accompanying drawings in which.

Like reference numerals are used to designate like parts throughout the accompanying drawings.

DETAILED DESCRIPTION

Target designators according to embodiments of the present invention are expected to find application in a variety of situations where presently known systems are either difficult or impracticable to operate. One exemplary embodiment of a target designator will now be described, in which the target designator is incorporated into a handheld launcher for a guided weapon.

Figure 1:
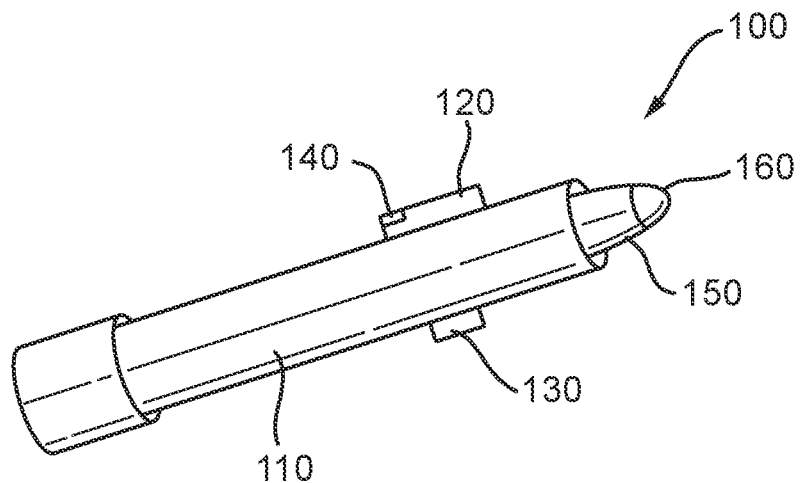
FIG. 1 is a schematic illustration of a handheld launcher in accordance with a first embodiment of an invention.
Figure 2A:
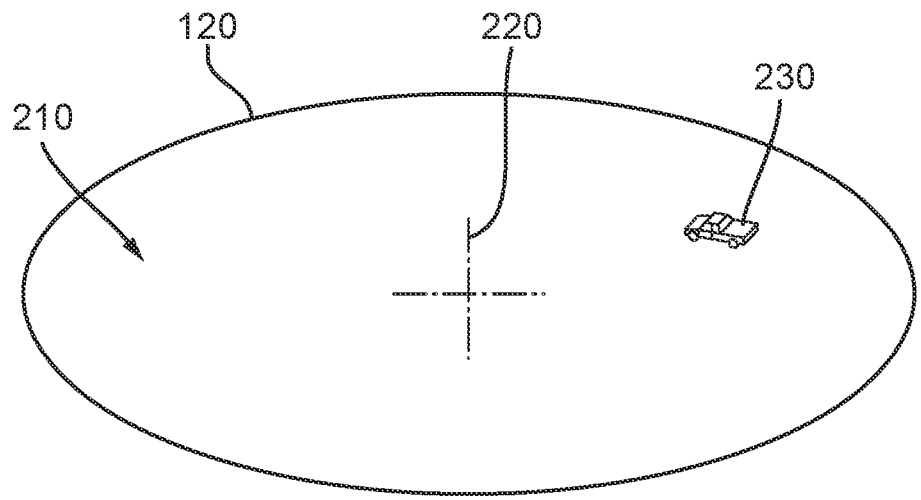
FIGS. 2A and 2B are schematic illustrations of an operator view through a sight associated with the handheld launcher illustrated in FIG. 1.
Figure 2B:
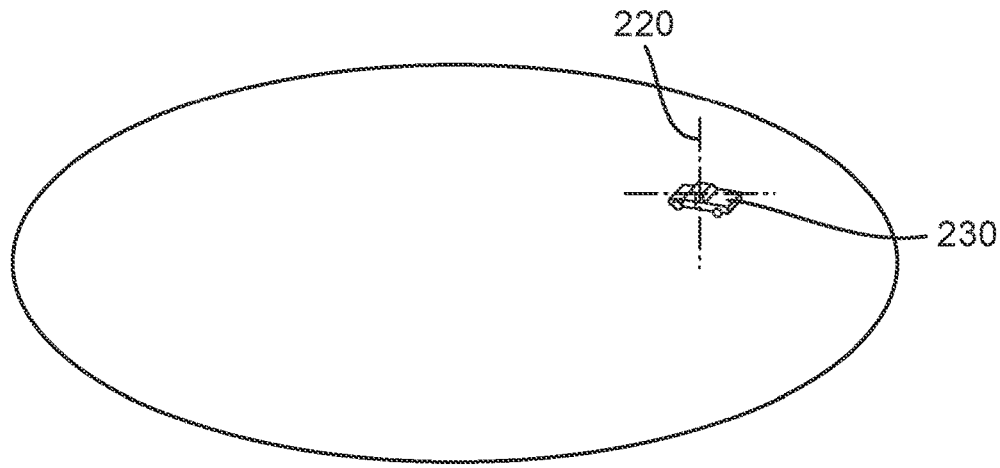

Handheld launcher 100 is illustrated in FIG. 1, and comprises launch tube 110, sight 120, and trigger 130. The launcher 100 is shown with weapon 150 mounted in tube 110 ready for launch. Launch of the weapon 150 is commenced on activation of the trigger 130 which, in the present embodiment, is a two-pull trigger. Weapon 150 is a guided weapon, and comprises a sensor cluster 160 mounted in the nose region of the weapon, as well as an on-board processor able to perform guidance algorithms such that on launch, the weapon is guided towards a target designated to it by an operator, such as target 230 (as shown in FIGS. 2A and 2B). The sensor cluster 160 includes a camera which, when the weapon 150 is mounted in the launcher 100, feeds an image of the scene in the camera field of view to the sight, so that the operator's view through the sight is that of the weapon's sensor cluster. As shown in FIG. 1, the sight 120 is mounted on the launch tube 110 and is positioned such that the operator can look into the sight whilst supporting the launcher and weapon on a shoulder and steadying it using hands.

Sight 120 in addition comprises an eye tracker 140 that is integrated into the sight so as to be operable to track the movements of the operator's gaze whilst the operator views the scene displayed by the sight. A schematic illustration of the operator's view through the sight, prior to the first pull of the trigger 130 is shown in FIG. 2A. The view includes the scene 210 as imaged by the weapons sensor cluster 160.

The first pull of the trigger causes the sight to display a reticule 220 superimposed over the scene 210, as is illustrated in FIG. 2B. The position of the reticule 220 is determined by the direction of the operator's gaze, as measured by the eye-tracker 140. When the direction of the operator's gaze changes, the position of the reticule 220 in the sight changes so as to be centred on the point in the scene 210 on which the operator is focussing attention. Thus, by gazing at the target, the operator is able to move the reticule 220 over the target. Once the correct target is centred in the reticule 220, the operator performs the second pull of the trigger in order to designate the target to the weapon, and launch the weapon.

In the present embodiment certain aspects of the sight can be controlled by eye gestures such that the operator can control the sight without the need to use hands. The eye gestures are predefined in software and recognised from the output of the eye tracker. Thus, when the eye-tracker records that the gaze of the operator is remaining near an edge of the scene displayed by the sight, the field of view displayed by the sight can be panned in that direction. If the operator's gaze remains fixed on a certain point within the scene without a target being designated by a second pull of the trigger, the sight can zoom (either optically or, if the sensor cluster 160 is not able to optically zoom, digitally) in on that region in order to magnify it. Alternatively, if the operators gaze wanders around the periphery of the displayed scene, the sight will zoom out so as to display a wider field of view to the operator.

Figure 3:
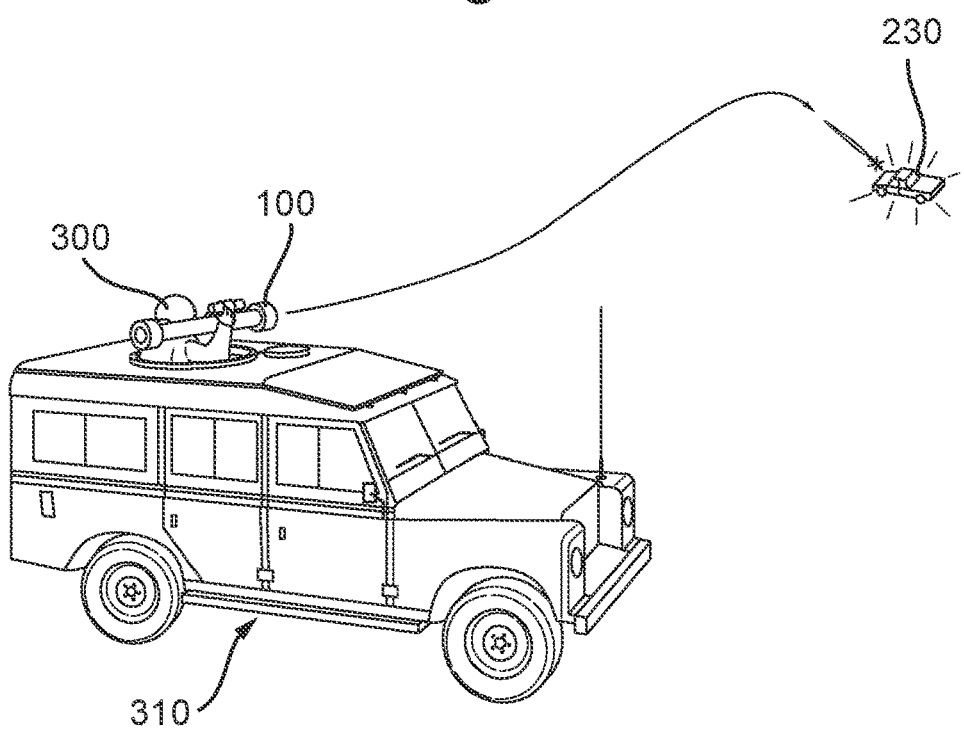
FIG. 3 is a schematic illustration of the handheld launcher of FIG. 1 in use.

FIG. 3 is a schematic illustration of how the above-described embodiment may be used. An operator 300 holds launcher system 100 whilst standing in a moving vehicle 310. Target 230 is an enemy moving vehicle. The operator is able to designate the target by focussing his gaze on it, and then launch the weapon such that the weapon's guidance system guides it towards the target. Designation of the moving target is only possible because no hand control or thumb controls are required to designate the target: the fine movements required to designate the target to the weapon are very difficult when the operator is standing on an unpredictably moving platform, and impracticable in a combat situation.

Figure 4:
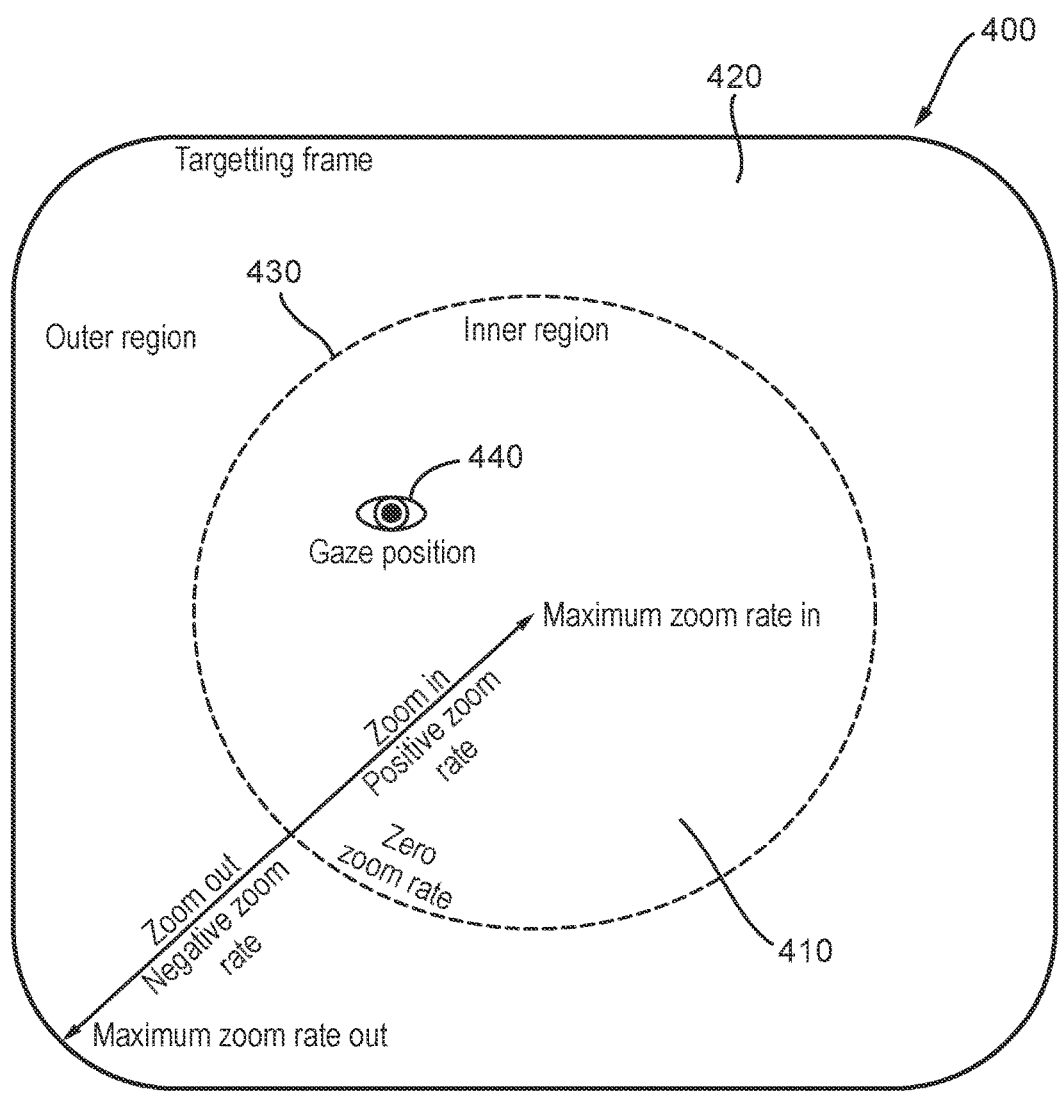
FIG. 4 is a schematic illustration of an operator view through an alternative sight for use with the handheld launcher illustrated in FIG. 1.

FIG. 4 is a schematic illustration of an operator view through an alternative sight that can be used with a handheld launcher as described above. Sight 400 is divided into regions 410 and 420, separated by a boundary indicated by dashed line 430. Region 410 is a circular region around the centre of the sight 400, whilst region 420 covers the peripheral regions of the sight.

A human operator of a handheld launcher or complex weapon, for example launcher 100 illustrated in FIG. 1, may be required to find and identify a target and cue the guidance strategy. The combination of target size and the sighting system field of view may conspire to make the target appear small in the targeting frame. A small target at some distance from the weapon may only occupy a few pixels of the sighting system, which will not only make it hard to find in the frame but also once found the low resolution and small size will also make it hard to identify. Furthermore, once found and identified it may be hard to accurately place the targeting reticule upon a target that only occupies a very small portion of the screen.

The portion of the screen that contains the target can be enlarged through either an optical zoom to increase the resolution of the target or through a digital zoom to simply increase its apparent size in the frame without an associated increase in resolution. Both of these methods of zooming the display can be of great advantage to the operator in the effort to identify the target and to cue the weapon. For example, an optical zoom will enable the operator to better resolve the target and therefore improves the ability to identify it. For example, if a digital zoom is employed the intended target remains unresolved but consumes a large portion of the targeting frame. In this case the ability of the operator to place the targeting reticule on that target is greatly improved.

In the present embodiment alternative eye gestures are used to provoke this display zooming behaviour. The basis of the present zoom control is through a measure of how long the operator's gaze, indicated schematically at 440 in FIG. 4, lingers on a particular portion of the screen. If the operator's gaze remains focussed upon the central region 410 of the targeting frame, the weapon sights will zoom into that part of the display. If the operator's gaze is around the peripheral region of the display 420, the weapon sight will zoom out.

When the operator's gaze is near to the centre of the targeting frame in region 410, the display will zoom in at it maximum rate until it reaches a suitable maximum size. If the operator's gaze inhabits the extreme edge of the screen in region 420, or outside the screen, the display will zoom out at its maximum rate until the entire field of view is visible. When the gaze lingers between these two limits the zoom rate and direction will be moderated depending upon whether the gaze inhabits region 410 or region 420.

The boundary 430 between regions 410 and 420 marks the transition between zooming in and zooming out. The zoom rate at this boundary is therefore zero. The distance from boundary 430 and the centre of the inner region 410 will moderate how fast the display will zoom in. Near the boundary 410 the rate at which the display will zoom in will be minimal. As the eye moves further from the boundary 410, towards the centre of the screen the zoom rate inwards will increase until a maximum zoom rate selected for the specific implementation is reached. Note that the enlargement of the display may have the effect of drawing the object of interest to the centre of the screen, reinforcing the increase of the zoom rate towards the object of interest. The boundary 430 may be visible or not visible to the operator. The boundary 430 can vary depending on whether the eye is moving from inner region 410 to outer 420 or vice versa. There may in some further embodiments be a boundary region of defined thickness, rather than a boundary line, exhibiting no zoom.

If the gaze lingers in region 420, near to the boundary 430, the display will zoom out slowly. As the gaze moves away from this boundary 430 towards the edge of the screen the zoom rate will increase. At the edge of the targeting frame, when the gaze is as far from boundary 430 as possible, the display will zoom out at its maximum rate.

In a variation of this technique, the position of the inner region is managed depending upon where the operator gaze lingers. The inner region 410 may slowly drift towards the gaze point, imposing an increasing zoom upon this focus.

In a further variation of this technique, the size, shape or zoom rate of the inner region 410 may be varied depending upon the gaze behaviour. For example, if the gaze focuses upon a feature on the display, the process above may provoke a zoom into this feature. However, as the gaze lingers upon this feature the size of the inner region 410 may shrink, facilitating a rapid zoom out should the operators focus move elsewhere.

In further variations, the total amount of zoom, rather than the zoom rate, is managed by the gaze position in a similar manner.

Whilst a specific embodiment of the invention has been described in the above, it is to be noted that variations and modifications to that embodiment are possible without departing from the scope of the present invention, which is defined in the accompanying claims. For example, whilst it has been described in the above to integrate the eye tracker with the sight on a handheld launcher, it will be appreciated that the eye tracker may instead be helmet mounted and separate from the launcher system, communicating with the launcher system either via a wired connection or wirelessly. In such cases the sight may be provided by a helmet mounted display, showing a moving reticule, or by a separate telescopic device. Commercial-off-the-shelf eye tracking systems, available from suppliers such as Tobii® are of sufficient performance to enable eye tracking in such a manner.

Such helmet mounted systems may also be used to designate a target to a remote weapon. For example, an operator on the ground, wearing a helmet mounted eye tracker can gaze at a desired target and designate that target to the weapon either by a two pull, handheld trigger, similar to that described in the above. Such target designators will be significantly easier to use than hand controlled designation means, where fine control is needed to designate the correct target. The remote weapon may be either launched from a remote battery, several kilometres away from the operator, from an aircraft in the vicinity of the operator, or from an alternative remote location. Such target designators will be easier to use than existing systems, particularly where the operator is encumbered by other equipment, such as a rifle pack, or by the need to carry other heavy loads, such as a stretcher or a wounded colleague.

Moreover, the skilled person will recognise that alternative target designation mechanisms will be possible. For example, rather than use a manually operated trigger to designate the target, the target may automatically be designated when the operator's gaze stays fixed on a particular object for longer than a certain period of time, if a definite object can be recognised by image analysis algorithms, or when the operator performs an alternative predefined eye gesture, such as a wink. The period of time may be configurable by the operator, but is anticipated to be more than one second. The reticule may be displayed permanently in the sight, or when the sight detects that it is in use (for example through recognising that an operator is close by), rather than only when a trigger is pulled for a first time. Target designation can then be confirmed by the action of the operator pulling the trigger to launch the weapon. In the event that an incorrect target is designated, a correction can be applied by recognising either that the operator's gaze is no longer fixed on the same point, or the designation can be cancelled if the weapon is not launched within a predetermined time period (for example, three seconds).

The invention claimed is:

1. A target designator for a guided weapon, the designator comprising a sight arranged to display, in operation, a reticule superimposed upon a field of view, the reticule being moveable relative to the field of view; and an eye tracker operable to track the gaze of the operator whilst the operator uses the sight, the eye tracker being in communication with the sight such that the reticule moves so as to be aligned with the direction of the gaze of the operator, wherein the eye tracker is associated with a processor configured to recognise one or more eye gestures, and to control the sight such that the field of view displayed by the sight is altered in response to the one or more eye gestures, and wherein one of the one or more eye gestures causes the sight to zoom in on a portion of the field of view.

2. A designator as claimed in claim 1, wherein the eye tracker is mounted on the sight.

3. A designator as claimed in claim 1, wherein the eye tracker is a wearable device.

4. A designator as claimed in claim 1, wherein the sight is a telescopic device through which the field of view is visible.

5. A designator as claimed in claim 1, wherein the guided weapon is provided with a camera, and wherein the field of view displayed by the sight is provided by the camera.

6. A designator as claimed in claim 1, wherein one of the one or more eye gestures causes the sight to move the field of view.

7. A designator as claimed in claim 1, wherein one of the one or more eye gestures causes the sight to zoom out.

8. A designator as claimed in claim 1, wherein the designator is configured to detect when the operator's gaze settles on a particular object for longer than a predetermined period of time, and to designate that object to the guided weapon as a target.

9. A designator as claimed in claim 1, wherein the designator comprises communication means for communicating with a remote weapon such that a target can be designated to the remote weapon.

10. A target designator as claimed in claim 1, wherein the designator is a handheld target designator.

11. A handheld launcher for a guided weapon comprising a designator as claimed in claim 1.

12. A target designator for a guided weapon, the designator comprising a sight arranged to display, in operation, a reticule superimposed upon a field of view, the reticule being moveable relative to the field of view; and an eye tracker operable to track the gaze of the operator whilst the operator uses the sight, the eye tracker being in communication with the sight such that the reticule moves so as to be aligned with the direction of the gaze of the operator, wherein the display is configured to zoom either in or out depending on the position of the operator's gaze within the field of view.

13. A designator as claimed in claim 12 wherein the display has first and second regions, and wherein the display will zoom in when the operator's gaze lingers in a first region, and zooms out when the operator's gaze lingers in a second region.

14. A designator as claimed in claim 13 wherein the rate of zoom is dependent on a distance between the operator's gaze and the boundary between the first and second regions.

15. A target designator for a guided weapon, the designator comprising a sight arranged to display, in operation, a reticule superimposed upon a field of view, the reticule being moveable relative to the field of view; an eye tracker operable to track the gaze of the operator whilst the operator uses the sight, the eye tracker being in communication with the sight such that the reticule moves so as to be aligned with the direction of the gaze of the operator; and a trigger device, wherein the designator is configured such that, upon a first operation on the trigger device, the weapon selects as a target an object on which the reticule is centred.

* * * * *